United States Patent
Minami et al.

(10) Patent No.: US 6,382,672 B1
(45) Date of Patent: May 7, 2002

(54) RESIN COVERED COMPONENTS OF A SEAT BELT

(75) Inventors: Yoshihiko Minami; Hideo Iseki, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/644,530

(22) Filed: Aug. 24, 2000

(30) Foreign Application Priority Data

Aug. 24, 1999 (JP) .............................. 11-237277

(51) Int. Cl.$^7$ ........................... B60R 22/00; A47C 31/00
(52) U.S. Cl. ...................... 280/801.1; 280/808; 297/483
(58) Field of Search .............................. 280/801.1, 808; 297/483

(56) References Cited

U.S. PATENT DOCUMENTS

| | | | |
|---|---|---|---|
| 4,101,171 A | * | 7/1978 | Sasaki et al. |
| 5,513,880 A | * | 5/1996 | Ohira et al. |
| 5,762,373 A | * | 6/1998 | Sugimoto |
| 5,918,903 A | | 7/1999 | Ito ........................... 280/801.1 |
| 6,138,328 A | * | 10/2000 | Iseki |

FOREIGN PATENT DOCUMENTS

DE          196 80 170 T1      2/1996

* cited by examiner

Primary Examiner—Brian L. Johnson
Assistant Examiner—Joselynn Z Sliteris
(74) Attorney, Agent, or Firm—Foley & Lardner

(57) ABSTRACT

To provide a seat belt component having a molded resin surface in which the burr formed by the resin is less conspicuous or eliminated. The seat belt component could be a shoulder anchor and have the added benefit of allowing the seat belt to slide smoothly therethrough. An externally formed structural element is formed on the metal surface to prevent further flow of the synthetic resin.

7 Claims, 4 Drawing Sheets

RESIN COVERED COMPONENTS OF A SEAT BELT

This application is related to Japanese Patent Application No. H11-237277, filed Aug. 24, 1999, the disclosure of which is hereby incorporated by reference in its entirety.

FIELD OF INVENTION

The present invention generally relates to components onto which a resin is molded, and more specifically, molding a resin body onto seat belt components such as a shoulder anchor, a tongue, and the like to lessen or eliminate burrs.

BACKGROUND OF THE INVENTION

The outer surfaces of seat belt components that are touched by a person's hand are typically molded out of a synthetic resin. At least a portion of the metal components may be covered by the resin.

FIGS. 6(a) and (b) are schematic sectional views illustrating the molding of a synthetic resin onto the outer surfaces of a metal plate by a conventional mold processing method. As shown in FIG. 6(a), a metal plate 3 is inserted into a cavity 4. Cavity 4 is created by the joining of metal molds 1 and 2. A synthetic resin is charged into the cavity 4 by an injection machine or the like. After the resin hardens and the metal molds are removed, a component composed of the metal plate 3 whose outer surfaces are covered with a synthetic resin molded body 5 is obtained, as shown in FIG. 6(b).

According to the above-mentioned conventional mold processing method, a relatively large burr 6 can be made because the synthetic resin flows along the outer surfaces of the plate 3. The burr is created along at least a partial length of the defining edge or outer boundary of the molded resin body. The burr 6 not only lessens the aesthetics of the component but also possibility generates a friction force when coming into contact with a seat belt and thereby at least partially obstructing the smooth motion of the seat belt.

SUMMARY OF THE INVENTION

An object of the present invention is to overcome the drawback caused by a burr formed by the molding process. The burr is lessened in size or eliminated by forming an externally standing step surface or surfaces on the metal portion, preferably near the end of the molded resin body.

In such a molded component, the stepped surfaces would prevent the flow of synthetic resin. However, the occurrence of a large burr and/or the occurrence of a burr that obstructs the smooth sliding of a seat belt can be prevented. Specifically, when the metal component is inserted into the metal molds and a resin is injected, the injection is carried out by abutting the stepped surfaces of the metal component against the inner surfaces of the metal molds, and the stepped surfaces are pressed against the metal molds by the pressure of the injected resin. Accordingly, no or a smaller gap is formed between the stepped surfaces and the inner surfaces of the metal molds and consequently no or a smaller burr is made.

The present invention is directed to overcoming or at least reducing some of the problems set forth above and at least is directed to accomplishing at least some of the objectives set forth above.

BRIEF DESCRIPTION OF THE DRAWINGS

FIG. 7 is a sectional view showing an embodiment of the present invention, with

DETAILED DESCRIPTION OF THE PREFERRED EMBODIMENTS

An embodiment of the present invention will be described below with reference to drawings. FIG. 7 is a sectional view showing a component according to an embodiment of the present invention and also illustrates a method of manufacturing the component.

Figure 1:
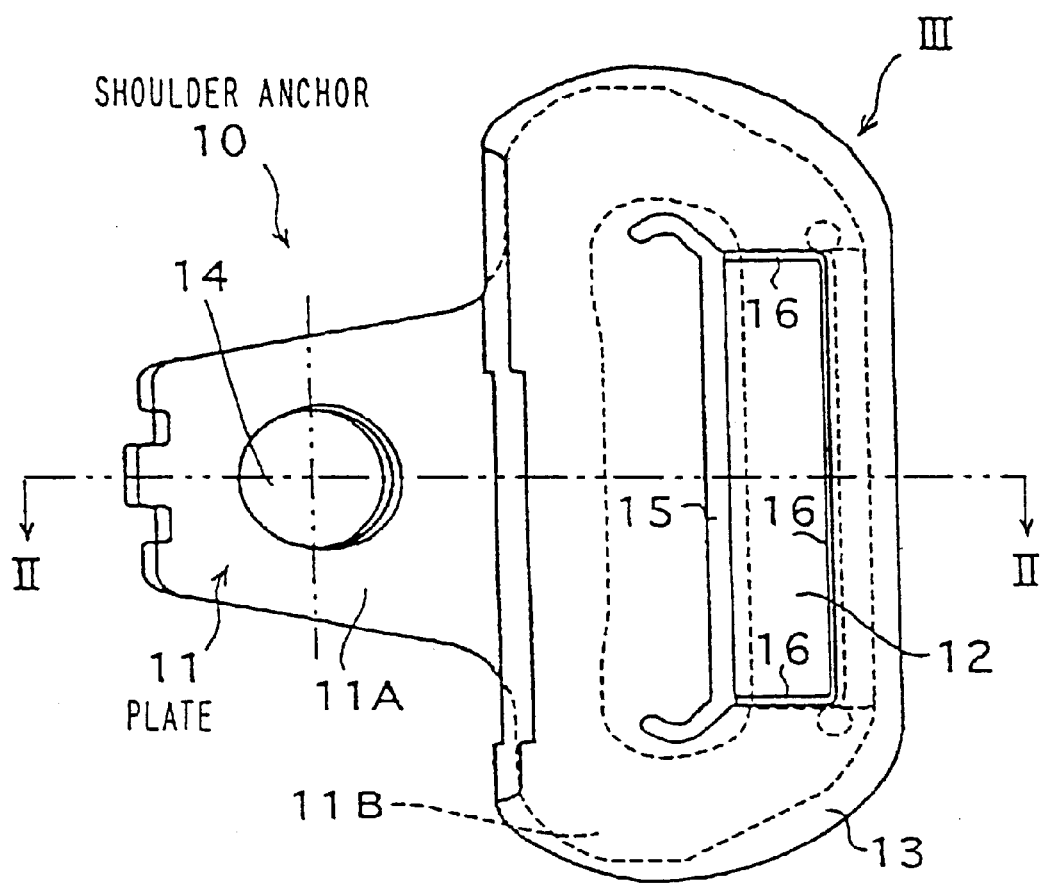
FIG. 1 is a plan view of an shoulder anchor according to an embodiment of the invention.
Figure 2:
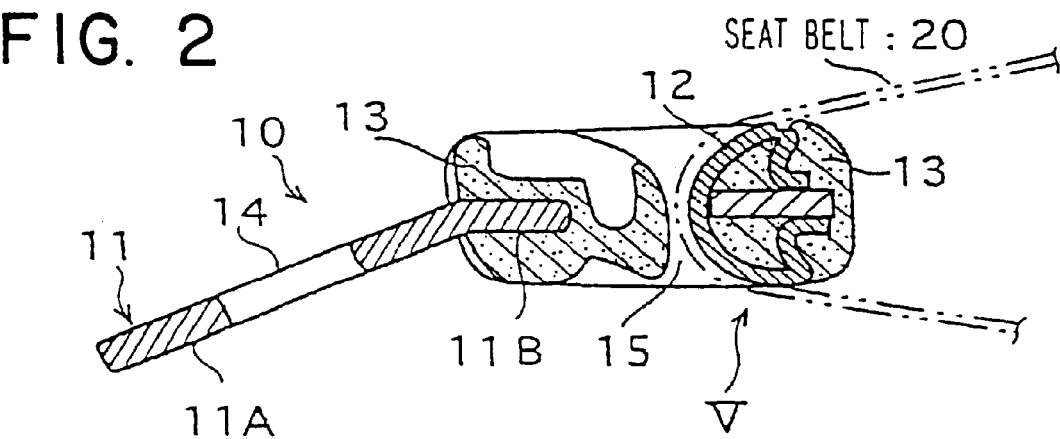
FIG. 2 is a transverse sectional view taken along the line II—II of FIG. 1.
Figure 3:
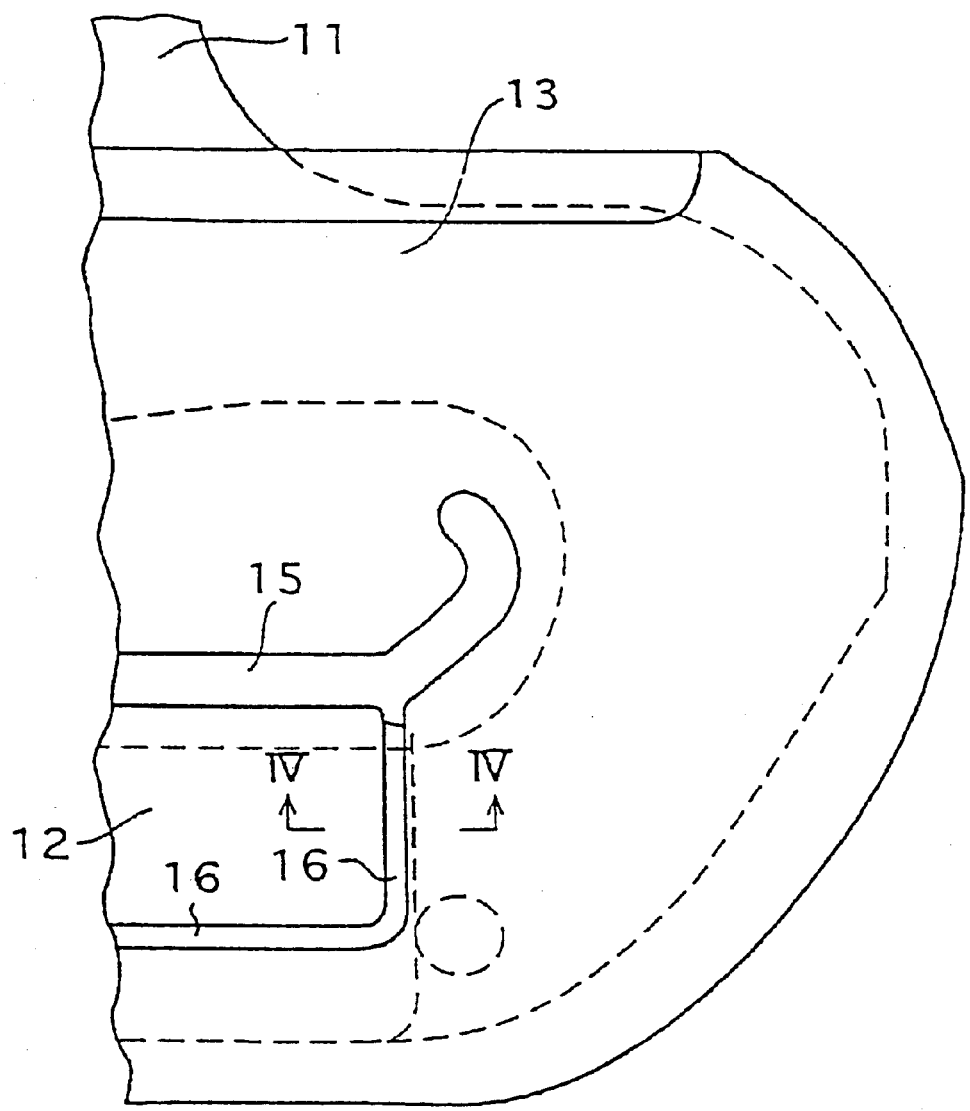
FIG. 3 is partial enlarged view of the rear portion of the shoulder anchor shown by III of FIG. 1.
Figure 4:
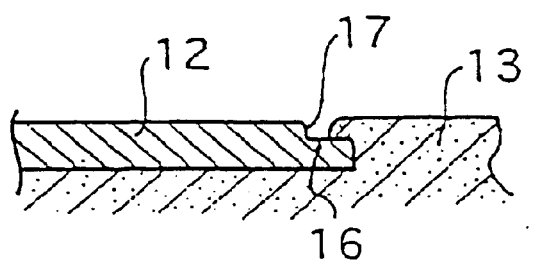
FIG. 4 is a sectional view taken along the line IV—IV of FIG. 3.
Figure 5:
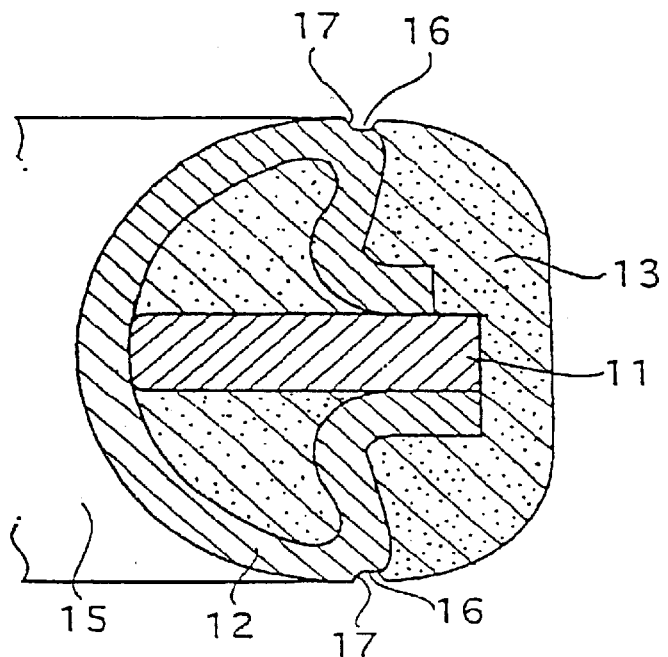
FIG. 5 is a partial enlarged view of the portion V of FIG. 2.
Figure 6A:
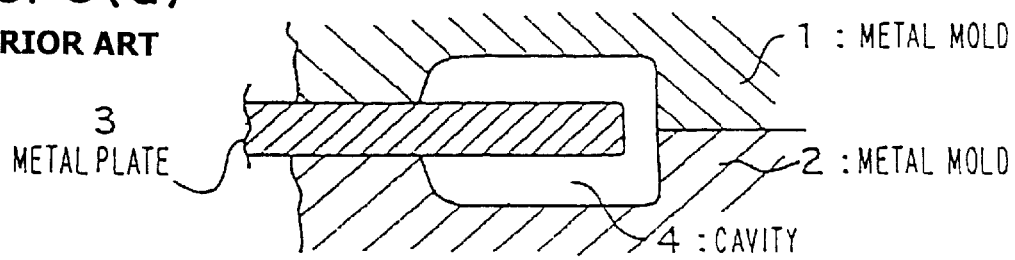
FIG. 6 is a sectional view showing a conventional example.
Figure 6B:
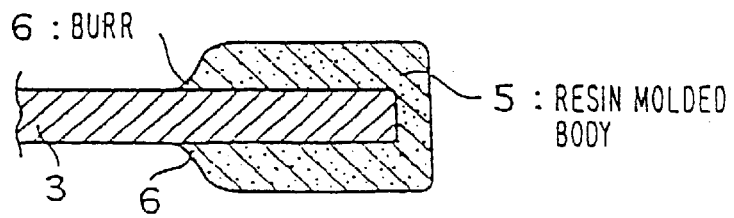
Figure 7A:
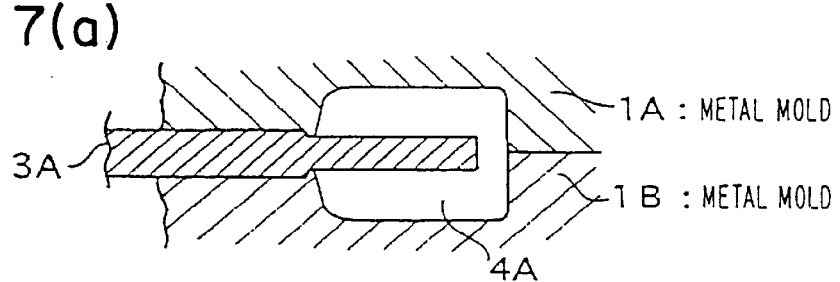
FIG. 7(a) showing the injection molding set-up and FIG. 7(b) showing the finished product.
Figure 7B:
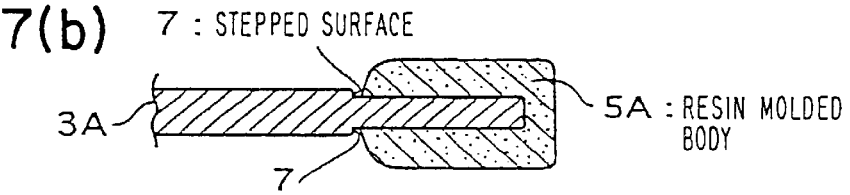

As shown in FIG. 7(a), a metal plate 3A is inserted into a cavity 4A formed by metal molds 1A and 1B and a synthetic resin is charged into the cavity 4A by an injection machine or the like. A component having a synthetic resin molded body 5A molded on the outer surfaces thereof is obtained after hardening the resin and removing the molds, as shown in FIG. 7(b). The metal plate 3A includes externally standing stepped surfaces 7 at portions near, and preferably very near, to an end of the synthetic resin molded body 5A. The provision of the stepped surfaces 7 prevents the flow of the synthetic resin any further down the length of the metal plate 3A and no burr spreads in an excessively wide range. Further, even if a burr is made, because it is at least concealed by the stepped surfaces 7, there is not a possibility that a seat belt is abutted against the burr so that the seat belt smoothly slides on the component at all times.

Figure 8:
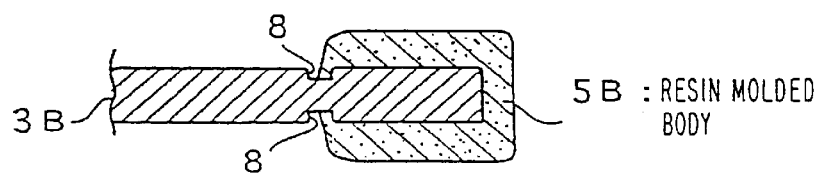
FIG. 8 is a sectional view showing an embodiment of the present invention.
Figure 9:
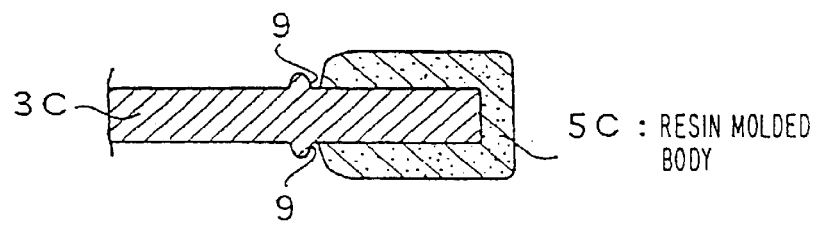
FIG. 9 is a sectional view showing an embodiment of the present invention.

In another embodiment of the present invention, stepped surfaces 8 may be formed by defining grooves or indentations as in a metal plate 3B of FIG. 8. Alternatively, in yet another embodiment, stepped surfaces 9 may be formed by providing projections as in a metal plate 3C of FIG. 9.

FIGS. 1 to 5 show the arrangement of a shoulder anchor according to the first embodiment of the present invention. The shoulder anchor 10 includes a metal plate 11, a seat belt guide 12 fitted on the plate 11 and having a C-shaped cross section, and synthetic resin molded bodies 13 molded so as to adhere to the plate 11 and the seat belt guide 12.

A bolt insertion hole 14 is defined through the front portion 11A of the plate 11 to fasten the shoulder anchor 10 to the pillar or the like of an automobile. Further, an opening (slot) 15 is defined at the rear portion 11B of the plate 11 to pass a seat belt 20 therethrough. A seat belt guide 12 is mounted on the rear edge portion (right edge of FIG. 2) of the inner peripheral edge of the opening 15.

One of the synthetic resin molded bodies 13 is molded on the rear portion of the plate 11 using metal molds. The synthetic resin molded body 13 is formed so as to expose the curved surface of tie seat belt guide 12 on the opening 15 side thereof. Further, the synthetic resin molded body 13 covers the rear end surface (right end surface of FIG. 2) of the seat belt guide 12. As shown explicitly in FIGS. 3, 4 and 5, a recessed stepped portion 16 having a stepped surface 17 is formed on the projecting square portion of the seat belt guide 12. The synthetic resin molded body 13 is formed so as to come into the recessed stepped portion 16.

The seat belt 20 is inserted through the opening 15 of the shoulder anchor 10 arranged as described above and extended along the seat belt guide 12. In the shoulder anchor 10, because the stepped surface 17 is defined on the projecting square portion of the seat belt guide 12, the synthetic resin molded body 13 does not protrude to the outer peripheral surface (surface for guiding the seat belt) of the seat belt guide 12. As a result, a burr, which at least partially obstructs the smooth sliding of the seat belt 20, is not made or is made of a smaller size. Accordingly, the seat belt 20 smoothly slides through the seat belt guide 12 at all times.

As described above, when a seat belt component of the present invention is made, the burr of the synthetic resin molded body is less conspicuous and has better aesthetics qualities. Further, the seat belt can slide more smoothly at all times through the component because no burr or a smaller burr is created, thereby allowing for decreased obstruction of its travel.

While preferred embodiments have been shown and described, it should be understood that the changes and modifications can be made therein without departing significantly from the invention in its broader aspects. For example, while reference number 10 in FIGS. 1–5 refers to a shoulder anchor, the reference number 10 could also refer to a tongue for a seat belt buckle or other similar component. Various features of the invention are recited in the following claims. Furthermore, the figures are provided for the purpose of illustration and are not necessarily drawn to scale.

We claim:

1. A seat belt component comprising:
   a metal component including a hole through which a seat belt can pass;
   a seat belt guide overlying the metal component and having a surface for guiding the seat belt through the hole; and
   a resin body molded on the surface of the metal component;
   wherein the seat belt guide includes a stepped portion adjacent the resin body for preventing the resin body from protruding onto the surface for guiding the seat belt.

2. The component of claim 1 wherein the stepped portion is an indentation.

3. The component of claim 1 wherein the stepped portion is a projection along at least a portion of a defining edge of the molded resin body.

4. The component of claim 1 wherein a seat belt is tacked and passed through the component and at least of a portion of the molded resin body is located near or in contact with the seat belt.

5. The component of claim 1 wherein the seat belt component is a shoulder anchor.

6. The component of claim 1 wherein the seat belt component is a tongue.

7. The component of claim 1 wherein no significant gap is formed at least a portion of the mutual length between the stepped portion and the molded resin body.

* * * * *